March 31, 1970 M. F. SLANA 3,504,127

DIRECT CURRENT COMPENSATION CIRCUIT FOR TRANSFORMER COUPLINGS

Filed May 2, 1967 2 Sheets-Sheet 1

INVENTOR
M. F. SLANA

BY

R. C. Winter
ATTORNEY

United States Patent Office 3,504,127
Patented Mar. 31, 1970

3,504,127
DIRECT CURRENT COMPENSATION CIRCUIT FOR TRANSFORMER COUPLINGS

Matthew F. Slana, Naperville, Ill., assignor to Bell Telephone Laboratories, Incorporated, Murray Hill, N.J., a corporation of New York Filed May 2, 1967, Ser. No. 635,423
Int. Cl. H04m 3/08
U.S. Cl. 179—16 9 Claims

ABSTRACT OF THE DISCLOSURE

An optical, direct current compensation circuit in the line repeat coils of a telephone system which utilizes a holding current in the switching network talking paths. Photons generated by the line loop holding current establish the level of holding current in the corresponding network loop via a photo-sensitive resistance element.

BACKGROUND OF THE INVENTION

The transformer terminating telephone lines is designed to repeat intelligence signals to the switching network, to provide balance and to circulate the direct current "talking battery." A major factor in the design of such telephone repeat coils is the need to avoid the effects of the magnetomotive force produced by passage of direct current through the primary windings. This is accomplished through the use of additional copper and iron in the transformer elements which, of course, adds to the transformer cost.

A switching network is disclosed in a copending application of M. F. Slana and H. A. Waggener, Ser. No. 635,497, filed May 2, 1967, which network requires a direct current bias to hold each talking path established through the network. In such an arrangement, direct current circulates through the secondary windings of the telephone repeat coils, thus further aggravating the transformer design problem.

SUMMARY OF THE INVENTION

This problem is turned to advantage in accordance with this invention by employing the magnetomotive force produced by the direct current in the network loop to cancel the magnetomotive force produced by the direct current in the line loop. While the network loop direct current is a constant, the line loop direct current varies from line to line over a considerable range, depending upon the length of each line loop. Thus steps in addition to the mere equalization of current values must be taken. These include a determination of the mean line loop direct current for all lines terminating on the switching center and the design of the switching network to utilize a network loop direct current which would produce a zero net magnetomotive force in any line transformer conducting the mean line loop direct current through its primary windings.

An optical coupling is established between the transformer primary and secondary with photo-emissive devices in the primary illuminating photoresistors in the secondary at the level which will maintain the mean line loop direct current. If the line loop direct current is above the mean value, the photo-emission level will decrease the resistance in the secondary, thereby permitting the network loop direct current to increase to a level matching the line loop direct current. Similarly, a decrease in line loop direct current produces a corresponding decrease in the network loop direct current. The resultant current equalization provides a dramatic reduction in the net magnetomotive force in each line transformer over that encountered in the uncompensated transformer, thereby permitting a substantial saving in transformer cost without compromising the established transmission standards.

DRAWING

DETAILED DESCRIPTION

Figure 1:
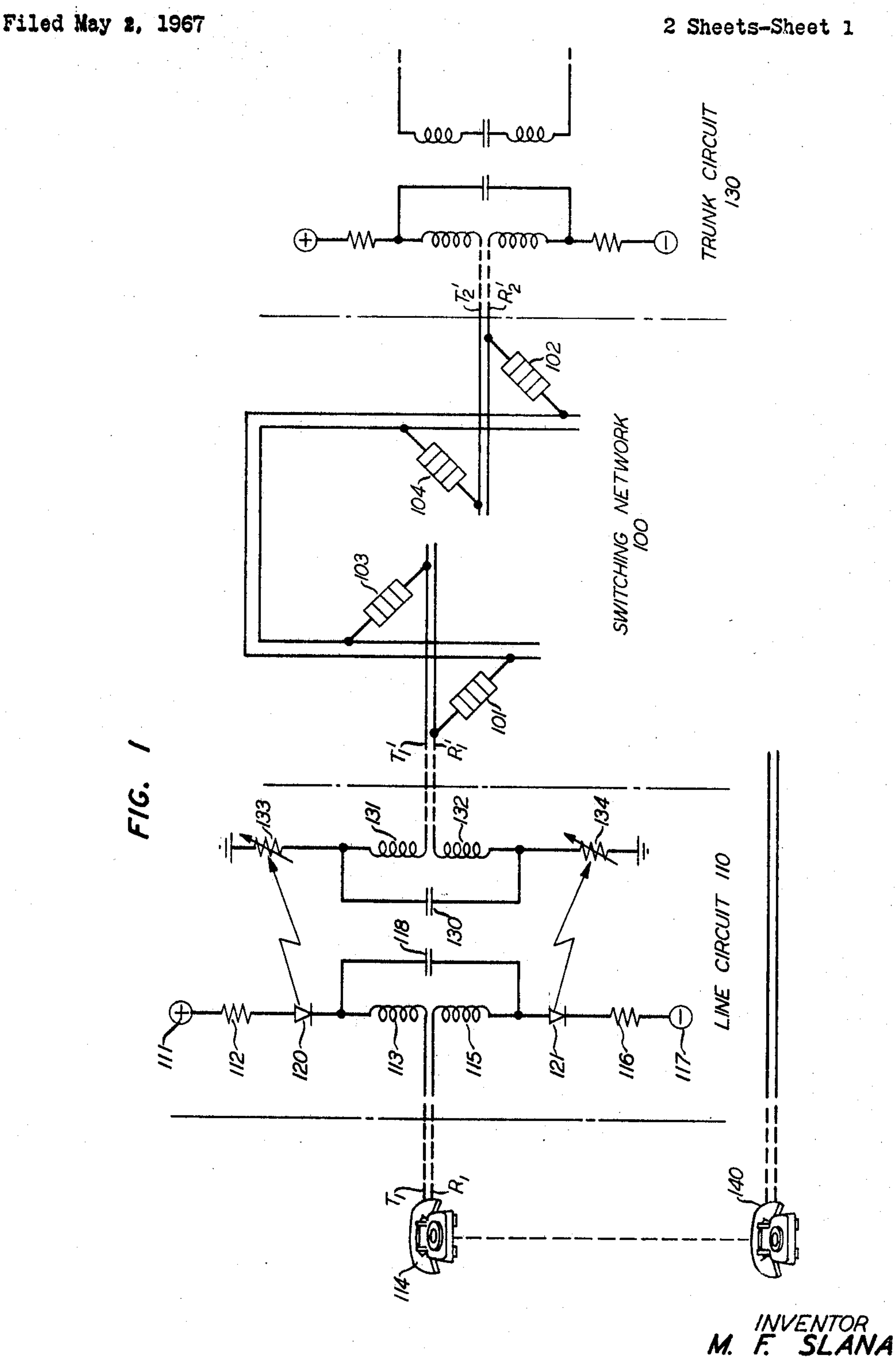
FIG. 1 depicts in schematic form one embodiment of the invention in a telephone system.

FIG. 1 is a diagram of those elements in a telephone system necessary to the disclosure of one illustrative embodiment of the invention. The switching network is of the type disclosed in the aforementioned M. F. Slana et al. patent application and illustrates only the network talking path or central office loop which serves to interconnect telephone lines or lines to trunks through a central office, as well known in the art.

The unique characteristic of this particular network arrangement is that multistate impedance elements such as PNPN diodes are used at the crosspoints. Thus when the particular network loop illustrated in FIG. 1 is completed, PNPN diode 101 in the ring lead $R_1'$ of the first stage of switching network 100 is enabled, as is PNPN diode 102 in the ring lead $R_2'$ of the second network stage, and diodes 103 and 104 in the corresponding tip leads $T_1'$ and $T_2'$ of the first and second network stages, respectively. This completes a network loop to permit intelligence transmission between line circuit 110 and trunk circuit 130.

Since PNPN diodes can only be maintained in a conductive state by the application of a direct current holding bias, such a bias must be applied in this instance directly to the central office loop itself. The presence of a direct current in a central office loop creates a condition not present in contemporary telephone systems. Previously only the telephone line loops circulated direct current, referred to as "talking battery," and in order to repeat voice or other intelligence signals to the central office switching network while isolating the central office from the talking battery in individual telephone line loops, a line transformer, designated the repeat coil, was included in each line circuit.

This repeat coil included the elements illustrated in line circuit 110 of FIG. 1. Thus on the line loop side of the transformer, a path may be traced from positive battery 111 through resistance 112, primary coil 113, tip lead $T_1$, subset 114, ring lead $R_1$, primary coil 115 and resistance 116 to negative battery 117. This constitutes a direct current path through the line loop. Capacitance 118, bridging the primary coils 113 and 115, provides a unidirectional current path through the transformer primary for alternating current signals to be coupled through the repeat coil to switching network 100.

Again in the conventional repeat coil, the central office side of the repeat coil in line circuit 110 may comprise secondary coils 131 and 132, separated by capacitance 130. A ground return path is indicated. This permits the induced current to flow through the central office loop, including tip leads $T_1'$ and $T_2'$ and ring leads $R_1'$ and $R_2'$, when PNPN diodes 101–104 are all enabled simultaneously.

In the embodiment illustrated in FIG. 1, the connection is completed to trunk circuit 130 which includes another repeat coil and, in addition, a source of holding current for the PNPN diodes 101–104. Such a holding current results in the presence of direct current flow through the secondary coils 131 and 132 of line circuit 110 and such flow, of course, would normally increase the problem encountered in design of repeat coils to cancel this unwanted current.

In accordance with this invention, this holding current in the central office loop is employed to advantage in effecting a cancellation of the magnetomotive force produced by the line loop current in the primary repeat coils 113 and 115. It would seem to be a straightforward proposition to merely establish the value of the central office holding current equal to the line loop current, thus effecting the desired cancellation without requiring additional circuitry and in the process greatly simplifying the composition of the line transformers. This would, in fact, be the case if the line loop current for all lines terminating on the switching network 100 were equal. However, since line loops vary in length, the corresponding line loop currents also vary over a considerable range. Thus the line loop current for station 114 may be 10 milliamperes, while the line loop current for station 140 may be as high as 50 milliamperes. Contrarily, the central office loop current must, of necessity, be a constant. Thus without compensation a decided unbalance will be experienced between various line loops and the corresponding network loops, which would make line transformer design extremely difficult, if not impossible.

One expedient would be to determine the mean line loop current for all lines terminating on switching network 100 and then to establish the network loop holding current at this mean line loop value. This, of course, would reduce the unbalance to some degree, but the transformer design problem would still be present.

This invention takes advantage of the mean line loop current approach in conjunction with an automatic direct current compensation scheme which includes an optical coupling in each repeat coil. Thus in FIG. 1 photo-emissive elements such as gallium arsenide diodes are included in series with each primary coil in the line transformer and corresponding photo-sensitive resistance elements are included in series with the secondary coils of the line transformer. In FIG. 1 diodes 120 and 121 represent the photo-emissive elements and variable resistors 133 and 134 represent the photo-sensitive elements. A flow of direct current through the line loop produces a photon emission from diodes 120 and 121, which emission establishes a corresponding resistance level in resistors 133 and 134. Consequently direct current flowing through the central office loop will match the direct current flowing through the line loop. If now the central office holding current is established at a level equivalent to the mean line loop direct current, the result will be a balance without the optical coupling in the line transformer for those line loops carrying the mean value of direct current. The presence of the optical coupling will serve to maintain this balance in these line loops.

In those instances whre the line loop current varies from the mean value, the photoemission will also vary in the same fashion. The result is a change in the resistance present in the central office loop and a consequent equalization of the central office loop current with the corresponding line loop current. For example, if the line loop current for line circuit 110 is greater than the mean line loop current established in this office, photon emission from diodes 120 and 121 will be greater than the photon emission experienced in line loops carrying the mean value direct current. Consequently, the resistance of elements 133 and 134 will be lower than that encountered in central office loops corresponding to line loops carrying the mean value direct current. With a lower resistance, of course, the central office loop current will be a higher value and will match the corresponding line loop current. The same situation exists in those line loops carrying direct current of a value less than the mean value. Of course in this instance, photon emission is at a lower level and the resistance in the corresponding central office loop thus is at a higher level.

Figure 2:
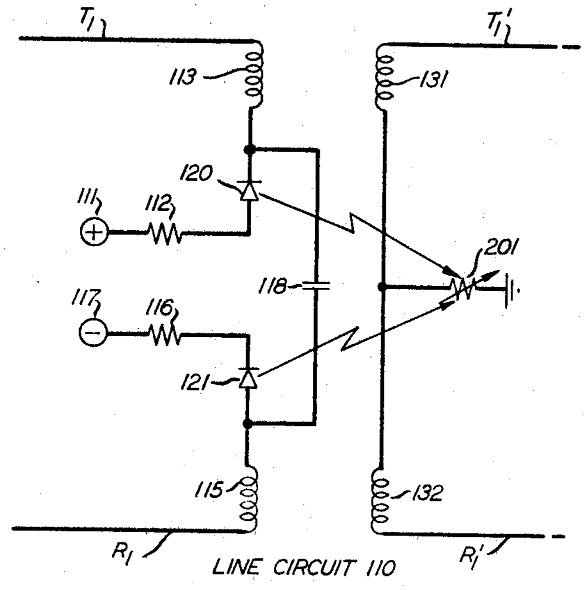
FIG. 2 depicts another embodiment of the invention suitable for use in the system of FIG. 1.

Turning now to FIG. 2, a second embodiment of the optical direct current compensation circuit is illustrated. Again the repeat coil on line circuit 110 is used for illustration, with the same elements employed on the primary side of the transformer. In this instance, however, the capacitance 130 is replaced in the secondary winding by a center tap to ground between secondary coils 131 and 132. Included in the ground path is a single photo-sensitive variable resistance element 201 which receives light from both photo-emissive elements 120 and 121 and alters the resistance of the central office loop accordingly. The ultimate effect is the same as that realized in the embodiment illustrated in FIG. 1.

Figure 3:
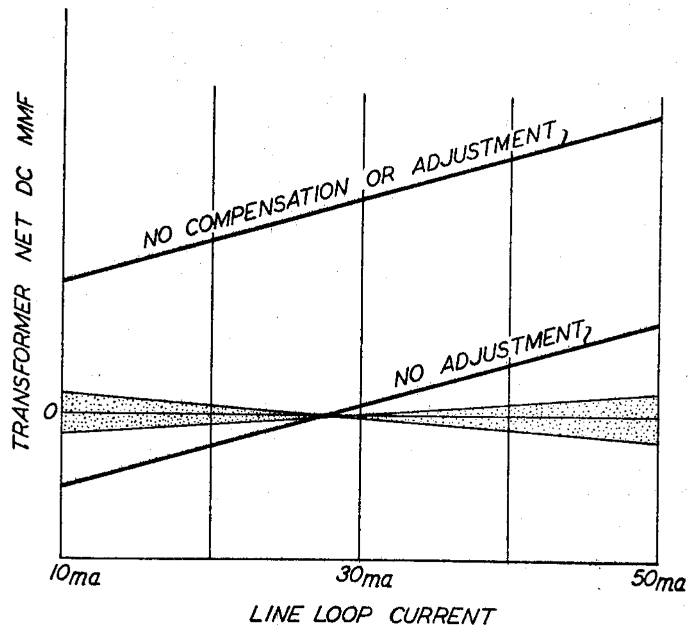
FIG. 3 is a graph of the results achieved with and without the automatic compensation circuit in accordance with this invention.

FIG. 3 is a chart illustrating the effect on the transformer net direct current magnetomotive force of the adjustment of the central office holding current to match the mean value of the line loop holding current and the additional effect of optical compensation in accordance with this invention. For this purpose it is assumed that the line loop direct current varies between 10 and 50 milliamperes according to the length of the line loop. It is readily apparent that the effect of central office loop current adjustment, as indicated by the cross-hatched area around the zero level, is quite dramatic in comparison with levels experienced with no adjustment or with no compensation or adjustment. Such a radical reduction in transformer net direct current magnetomotive force provides a corresponding reduction in cost of repeat coils for systems employing a holding current in the talking paths through the switching network.

It is to be understood that the above-described arrangement is illustrative of the application of the principles of the invention. Numerous other arrangements may be devised by those skilled in the art without departing from the spirit and scope of the invention.

What is claimed is:

1. A communication system comprising a plurality of lines, a switching network, a plurality of transformers each having a primary winding coupled to one of said lines and a secondary winding coupled to said network and means for circulating a direct current through the secondary transformer windings to hold connections through the network, characterized in that an optical coupling is established between the primary and secondary windings of each transformer, said optical coupling being responsive to a departure from the mean system line current in the primary winding to equalize the direct current flowing through the primary and secondary windings by varying the secondary winding resistance.

2. In a communication system a plurality of line loops of varying length, a plurality of central office loops of fixed length, and means for completing an intelligence transmission path through the system comprising means for circulating a direct current through a selected one of said line loops to maintain the line connection means for circulating direct current through a selected one of said central office loops to maintain the central office connection and optical means for equalizing the direct current flow through said selected line and central office loops.

3. In a communication system the combination in accordance with claim 2 wherein said optical means comprises photo-emissive devices in said selected line loop and photo-sensitive devices in said selected central office loop, said photo-sensitive devices being operative to vary the resistance of the central office loop in accordance with the level of light received from said photo-emissive devices.

4. In a communication system the combination in accordance with claim 3 wherein said optical means comprises a first photo-emissive device in the tip lead and a second photo-emissive device in the ring lead of said selected line loop.

5. In a communication system the combination in accordance with claim 4 wherein sad optical means further comprises a photo-sensitive resistance element in the tip lead of said selected central office loop responsive to light received from said first photo-emissive device and a photo-sensitive resistance element in the ring lead of said selected central office loop responsive to light received from said second photo-emissive device.

6. In a communication system the combination in accordance with claim 4 wherein said optical means further comprises a photo-sensitive resistance element connected between said selected central office loop and ground and responsive to light received from both of said first and second photo-emissive devices.

7. In a telephone system a plurality of line loops of unequal lengths resulting in the presence of holding current of various values in completed line loops, a plurality of central office loops of constant length resulting in the presence of the same value of holding current in all completed central office loops, a transformer coupling each of said line loops to a corresponding one of said central office loops, and optical means for matching the line loop holding current to the central office loop holding current to obviate losses at the coupling transformer.

8. In a telephone system the combination in accordance with claim 7 wherein said optical means comprises means for adjusting the resistance of a central office loop in response to receipt of photons generated in the corresponding line loop in proportion to the line holding current.

9. In combination a transformer having a primary and a secondary winding, a first loop connected to said primary winding and having a direct current flowing therein, a second loop connected to said secondary winding and having direct current flowing therein, said transformer providing alternating current coupling between said first and second loops, and current compensation means for obviating the losses in said transformer due to said direct currents flowing through said primary and secondary windings, said means comprising photo-emissive means in said first loop emitting photons at a level proportionate to the level of said direct current flowing through said first loop and photo-sensitive means in said second loop and operative in response to receipt of photons from said photo-emissive means to adjust the resistance of said second loop to said direct current flowing therein whereby the direct current flowing through said second loop is matched to the direct current flowing through said first loop.

References Cited

UNITED STATES PATENTS

| | | | |
|---|---|---|---|
| 3,358,217 | 12/1967 | Deelman | 315—158 |
| 3,187,104 | 6/1965 | Ebel | 179—16.5 |
| 3,321,745 | 5/1967 | Mansuetto et al. | 307—303 |
| 3,406,262 | 10/1968 | Grandstaff | 250—209 |

KATHLEEN H. CLAFFY, Primary Examiner

J. S. BLACK, Assistant Examiner

U.S. Cl. X.R.

250—209; 315—151, 155, 158; 333—1, 17